US007963311B2

(12) United States Patent
Perttilä et al.

(10) Patent No.: US 7,963,311 B2
(45) Date of Patent: Jun. 21, 2011

(54) VENEER LAY-UP SQUEEZING

(75) Inventors: Marko Perttilä, Nastola (FI); Jaakko Vilo, Turku (FI); Jori Sopanen, Villähde (FI)

(73) Assignee: Raute Oyj, Nastola (FI)

( * ) Notice: Subject to any disclaimer, the term of this patent is extended or adjusted under 35 U.S.C. 154(b) by 160 days.

(21) Appl. No.: 12/388,541

(22) Filed: Feb. 19, 2009

(65) Prior Publication Data

US 2009/0211688 A1 Aug. 27, 2009

(30) Foreign Application Priority Data

Feb. 22, 2008 (FI) ..................................... 20080146

(51) Int. Cl.
*B32B 37/00* (2006.01)

(52) U.S. Cl. ....................................... 156/581; 156/580

(58) Field of Classification Search .................. 156/228, 156/580, 581, 583.1; 100/315, 211, 295
See application file for complete search history.

(56) References Cited

U.S. PATENT DOCUMENTS 3,873,395 A * 3/1975 Ehrlich ......................... 156/382
4,776,919 A * 10/1988 Troutner et al. .............. 156/499
4,927,479 A * 5/1990 Bock ............................ 156/228

FOREIGN PATENT DOCUMENTS

DE 197 18 795 11/1998
GB 1 311 707 3/1973
GB 1 391 078 4/1975

OTHER PUBLICATIONS

Finnish Search Report, dated Jan. 22, 2009 and issued in corresponding Finnish Patent Application No. 20080146.

* cited by examiner

*Primary Examiner* — James Sells
(74) *Attorney, Agent, or Firm* — Young & Thompson

(57) ABSTRACT

The invention relates to squeeze pressing of a laid-up veneer assembly having glue applied as glue stripes. The pressing in the method is subjected to the assembly as two uniform fronts advancing in opposite directions from the central area of the assembly. A press for implementing the method comprises press plates to be pressed together, at least one press plate being equipped with a sub-pressing plate extending as an arch at the central area of the press plate to the press opening.

5 Claims, 3 Drawing Sheets

VENEER LAY-UP SQUEEZING

The present invention concerns a method for performing the so called squeeze pressing phase to be used in connection with manufacturing of plywood sheets, and an apparatus for the same. In the squeeze pressing phase of the manufacturing, a plywood laid-up assembly compiled of glued veneer sheets is pressed in order to spread the glue evenly between the veneers. Squeeze pressing takes place in the manufacturing process prior to the actual pressing, where the glue between the veneers is hardened.

BACKGROUND OF THE INVENTION

The veneer sheet laid-up assembly is compiled of superposed layers of veneer sheets, on the surface of which the glue bonding the sheets to each other is applied prior to the laying-up. The glue to be used can be foamed by admixing a significant amount of air thereto. The purpose of the foaming is to facilitate the dosing and application of the glue so that exactly the required amount, and not too much, of glue can be dosed between the veneers, and additionally the glue should be made to spread as evenly as possible between the veneers. The foamed glue facilitates the dosing and spreading action of the glue, but it also entails problems. The most significant problem is that effected by the air, the glue looses its adhesiveness quickly, in other words, it should be brought quickly into contact with the veneer surfaces to be bonded.

The glue, either foamed or unfoamed, is dosed onto the veneer surface to be sent to the lay-up (except for the face veneer) as stripes or pods, passing parallel at a defined distance from each other over the veneer surface (for example stripes of 3 mm at distances of 10 mm). Due to the deterioration of adhesiveness, the glue stripes must be spread as quickly as possible onto the veneer surfaces of the laid-up assembly to be bonded. For providing the spreading of the glue, each laid-up assembly is sent to squeeze pressing, where the assembly is subjected to a pressing effect being adequate for spreading the glue stripes between the veneers and for providing initial bond between the veneers. After this squeeze pressing the produced veneer sheet blanks are stacked to a multiple-opening press for hardening the glue by means of pressure and heat. The squeeze pressing is traditionally performed by guiding the laid-up assembly through a roller press.

Reasonable proceeding of the manufacturing phases of the veneer laid-up assembly leads to spreading of the glue stripes parallel with the direction of the advancing of the manufacturing. The assembly advances further to the press so that the pressing rolls will be in transverse direction with respect to the stripes. A problem with the roller pressing provided in this way is the line-shape pressing zone, advancing in the direction of the stripes starting from one edge of the laid-up assembly. There are problems associated with this method, especially when handling laid-up assemblies meant for manufacturing plywood sheets with multiple layers. The plywood can for example include 17 veneers for a 25 mm plywood. The laid-up assembly is no more properly controllable, but slips between the layers easily occur in the assembly. The glue just applied is slippery, and the slipping effect is increased by the air tending to escape from the glue due to the squeezing, whereby the veneer sheets are partly floating on an air cushion. The squeezing starting from one edge of the laid-up assembly also crowds out the glue, whereby less glue is left to the starting edge than to the opposite edge. The small amount of glue spread between the veneers at the starting edge dries quickly, and correspondingly the bigger amount at the opposite edge of the assembly makes the initial pressing sought by the squeezing more difficult.

Problems associated with the roller press have been tried to be solved by replacing the roller press with a plate press comprising two opposite press plates acting against each other. The blank to be prepressed is controllable, but problems have been discovered in the behaviour of the glue. It has been discovered, that the glue penetrates to the surfaces of the face veneers of the laid-up assembly. An obvious reason to this problem is the significant amount of air included in the glue, in addition to the air existing anyway in the intermediate spaces between the veneers. When the veneers are pressed together for providing the spreading of the glue, the air naturally tends to escape. A remarkable escaping route is in that situation the cracks and pores in the veneers, whereby the escaping air inevitably takes also glue along. Spreading of the glue onto the areas between the glue stripes has also not been always reliable.

A significant improvement for the above described problem is provided with a method in accordance with the present invention, and a press implementing the same. The characteristic features of the method and the press are stated in the enclosed claims.

BRIEF DESCRIPTION OF THE DRAWINGS

The invention will now be clarified with reference to the enclosed drawing, wherein.

DETAILED DESCRIPTION OF THE PREFERRED EMBODIMENTS

Figure 1:
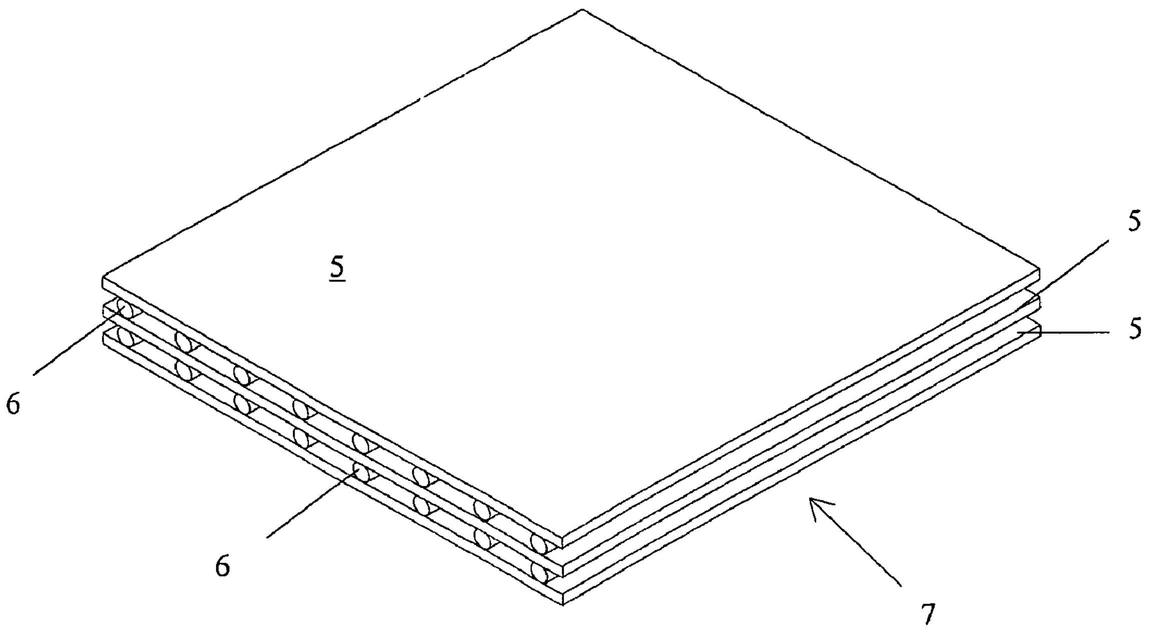
FIG. 1 shows a schematical view of a plywood sheet laid-up assembly with glue applied thereto.
Figure 2:
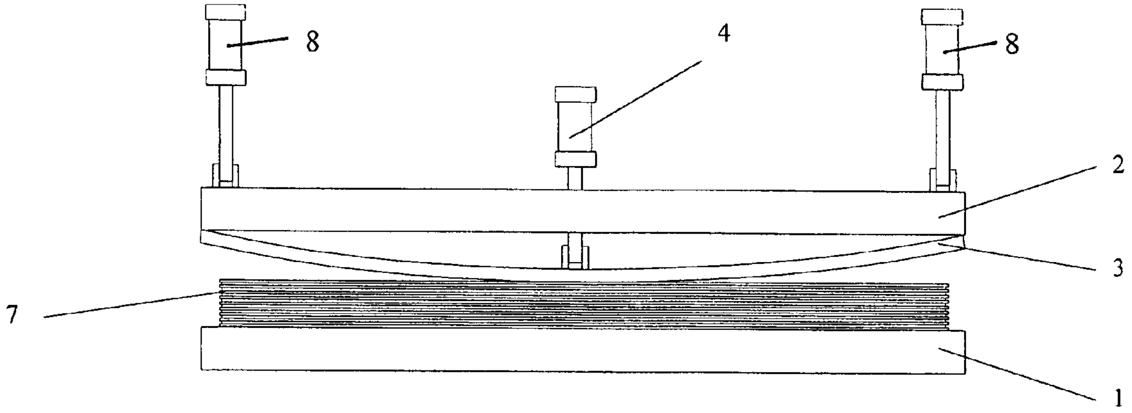
FIG. 2 shows a schematical view of one embodiment of a squeeze press implementing the method in accordance with the invention.

FIG. 1 shows an assembly consisting of veneer sheets 5, having between the sheets glue stripes 6 spread onto the sheets in the previous phase before laying up the assembly. For making the glue of the stripes 6 spread evenly between the veneer sheets, the assembly must be compressed with an adequate load, in other words, the stripes are squeezed between the veneers. For example a press according to FIG. 2 is suitable for this purpose.

The press comprises, like a traditional plate press, two press plates 1 and 2 acting against each other. The plates are brought to separate from each other by a power unit 8 of a usual kind. The laid-up assembly 7 to be pressed has been brought to an opened press opening. A special feature of the press is an additional plate 3 connected to the upper press plate 2 at the side of the press opening, shown schematically in FIG. 2.

The additional plate 3 is attached at its two opposite edges to the corresponding edges of the press plate 2 so that the additional plate is able to move to some extent with respect to the press plate 2, but is kept supported by it. One central pushing rod of a power unit 4 or a plurality of pushing rods in a central row is/are led through the press plate 2. By means of this rod or these rods, the additional plate 3 can be forced to bend at the middle outwards from the press plate 2 towards the press opening. During the pressing phase, when the press plates 1 and 2 are pressed against each other by means of the power unit 8 for closing the press opening, the pressing force is first subjected substantially as a line over the central area of the assembly 7.

The load provided by the power unit or units 4 bending the additional plate 3 to an arc is designed to be smaller than the load caused by the power units 8 for pressing the press plates against each other, whereby the curvature of the additional plate 3 yields when the press opening is closed. The yielding curvature of the additional plate 3 causes a press pushing proceeding from the middle of the assembly to the edges in opposite directions, causing squeezing of the glue according to the proceeded pushing. Thereby the air inside the glue and between the veneers is able to escape in front of the pushing and to remove from the composition at last via the open edge areas. The squeeze pressing can be discovered to be finished after the additional plate 3 has straightened against the press plate 2. Thus, the perpressed assembly can be stored for a moment to wait to be loaded for the pressing phase hardening the glue.

Figure 3:
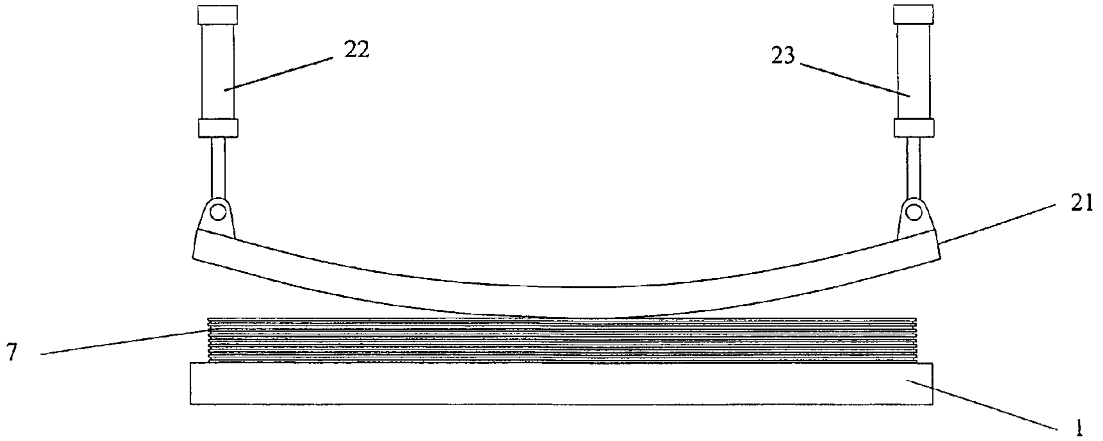
FIG. 3 shows a schematical view of another embodiment of the squeeze press implementing the method in accordance with the invention.
Figure 4:
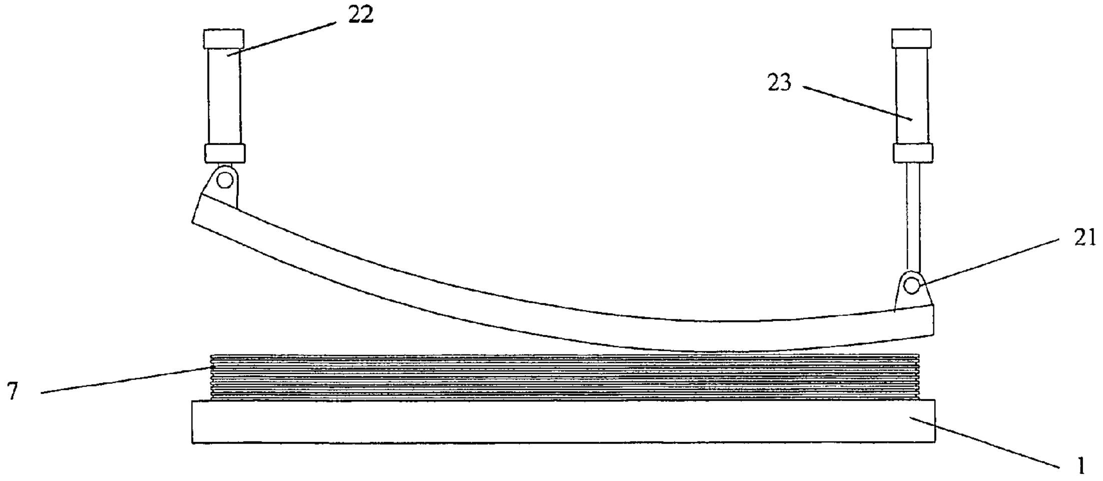
FIG. 4 shows the squeeze press according to FIG. 3 in another operating phase.

A substantially corresponding squeezing treatment can be provided with an apparatus shown in the enclosed FIGS. 3 and 4. The press comprises a flat press plate 1, onto which the laid-up and glued assembly of veneers is taken. Above the press plate there is an arched press plate 21 that is equipped with actuators 22, 23 for providing a press motion rolling back and forth against the press plate 21.

The invention claimed is:

1. A press for squeezing a plywood lay-up assembly, said press comprising:

two press plates, including an upper and a lower press plate, configured to press against each other;

a first power unit means for causing the plates to separate from each other and for providing a load to press the press plates against each other;

an additional plate connected to the upper press plate at a side of the press opening, the additional plate being movable with respect to the press plate; and a second power unit means comprising a central pushing rod extending through said upper press plate to force the additional plate to bend at a middle of the additional plate in a direction outwards from said upper press plate and towards the press opening, the second power unit configured to provide a load lower than a load of the first power unit means.

2. A press for squeezing a plywood lay-up assembly, said press comprising:

two press plates, including an upper and a lower press plate, configured to press against each other;

a first power unit means for causing the plates to separate from each other and for providing a load to press the press plates against each other;

an additional plate connected to the upper press plate at a side of the press opening, the additional plate being movable with respect to the press plate; and a second power unit means comprising a plurality of pushing rods in a central row extending through said upper press plate to force the additional plate to bend at a middle of the additional plate outwards from said upper press plate towards the press opening, the second power unit configured to provide a load lower than a load of the first power unit means.

3. A press for squeezing a plywood lay-up assembly, comprising:

upper and lower press plates facing opposite each other;

a first power unit connected to the upper press plate and configured to raise the upper press plate in an opening mode and to press the upper press plate against the lower press plate in a loading mode, the upper and lower press plates forming a press opening in the opening mode;

an additional plate, two opposite edges of the additional plate respectively attached to corresponding opposite edges of the upper press plate, the additional plate being movable with respect to the upper press plate; and a second power unit comprising at least one pushing rod, the at least one pushing rod extending through the upper press plate, the second power unit configured to apply a load upon a middle portion of the additional plate via the at least one pushing rod for causing the additional plate to bend at the middle portion in a direction away from the upper press plate and towards the press opening, wherein the second power unit is configured to provide a load less than a load of the first power unit means.

4. The press according to claim 3, wherein a curvature of the additional plate yields when the press opening is closed in the loading mode.

5. The press according to claim 3, wherein a curvature of the additional press plate is configured to straighten against the upper press plate when the upper and lower press plates are pressed against each other in the loading mode.

* * * * *